United States Patent
Yoshida et al.

(10) Patent No.: US 7,311,188 B2
(45) Date of Patent: Dec. 25, 2007

(54) ELECTROMAGNETIC CLUTCH

(75) Inventors: Motoaki Yoshida, Isesaki (JP); Hirokazu Ichinose, Isesaki (JP); Isamu Shirai, Isesaki (JP); Shigeru Ito, Isesaki (JP); Takao Shimoyama, Isesaki (JP)

(73) Assignee: Sanden Corporation, Gunma (JP)

( * ) Notice: Subject to any disclaimer, the term of this patent is extended or adjusted under 35 U.S.C. 154(b) by 92 days.

(21) Appl. No.: 10/923,823

(22) Filed: Aug. 24, 2004

(65) Prior Publication Data

US 2005/0045444 A1 Mar. 3, 2005

(30) Foreign Application Priority Data

Aug. 28, 2003 (JP) ............... 2003-305179

(51) Int. Cl.
F16D 27/112 (2006.01)
F16D 27/14 (2006.01)

(52) U.S. Cl. ............... 192/84.941; 192/84.961; 192/200

(58) Field of Classification Search ........... 192/84.941, 192/200; 464/94
See application file for complete search history.

(56) References Cited

U.S. PATENT DOCUMENTS

| 2,407,757 | A | * | 9/1946 | MacCallum | ............... 192/200 |
| 3,268,042 | A | * | 8/1966 | Sargeant et al. | ............ 192/84.3 |
| 3,543,538 | A | * | 12/1970 | Farrell et al. | ............... 464/93 |
| 5,036,964 | A | * | 8/1991 | Booth et al. | ........... 192/84.941 |
| 5,150,779 | A | * | 9/1992 | Booth | ..................... 192/200 |
| 5,195,625 | A | * | 3/1993 | Chang et al. | .......... 192/84.941 |
| 5,219,273 | A | * | 6/1993 | Chang | ........................ 464/89 |
| 5,234,377 | A | * | 8/1993 | Stretch et al. | .............. 192/208 |
| 5,390,774 | A | * | 2/1995 | Thurston et al. | ............ 192/200 |
| 5,632,366 | A | * | 5/1997 | Mullaney | .................... 192/84.1 |
| 6,194,803 | B1 | * | 2/2001 | Heim et al. | ........... 192/84.941 |
| 2002/0049089 | A1 | * | 4/2002 | Tabuchi et al. | ............... 464/30 |
| 2002/0140182 | A1 | * | 10/2002 | Schenk | ........................ 277/628 |
| 2003/0219564 | A1 | * | 11/2003 | Hubbard | .................... 428/40.1 |
| 2004/0059035 | A1 | * | 3/2004 | Krech et al. | ................. 524/416 |
| 2006/0174961 | A1 | * | 8/2006 | Sato | ........................... 138/140 |
| 2006/0182873 | A1 | * | 8/2006 | Klisch et al. | ................. 427/2.1 |
| 2006/0199910 | A1 | * | 9/2006 | Walton et al. | .............. 525/192 |

FOREIGN PATENT DOCUMENTS

CN 1180798 A 5/1998
JP 11063021 3/1999

* cited by examiner

Primary Examiner—Rodney H. Bonck
(74) Attorney, Agent, or Firm—Baker Botts L.L.P.

(57) ABSTRACT

An electromagnetic clutch for separably coupling a drive source and a rotary shaft has a rotor to be disposed in the outside of the rotary shaft concentrically therewith. The rotor is rotated by a drive source and accommodates an electromagnetic coil. The electromagnetic clutch has an armature plate that is attracted toward the rotor by an electromagnetic force generated by the electromagnetic coil so as to adhere to the rotor. Furthermore, the electromagnetic clutch has a coupler for coupling the armature plate and the rotary shaft to each other. The coupler includes a center part to be coupled to the rotary shaft and an elastically-deformable outer part for coupling the center part to the armature plate, the outer part being extended from the center part and elastically deformed when the armature plate is attracted to the rotor.

7 Claims, 10 Drawing Sheets

ELECTROMAGNETIC CLUTCH

This Nonprovisional application claims priority under 35 U.S.C. § 119(a) on Patent Application No. 2003-305179 filed in Japan on Aug. 28, 2003, the entire contents of which are hereby incorporated by reference.

BACKGROUND OF THE INVENTION

1. Field of the Invention

The present invention relates to an electromagnetic clutch, and more particularly to an electromagnetic clutch suitable for a compressor of a vehicle air-conditioning system.

2. Description of the Related Art

An electromagnetic clutch of this type is suitable for a compressor of a vehicle air-conditioning system and capable of intermittently transmitting a driving force from the engine to the main shaft of the compressor. For instance, the well-known electromagnetic clutch disclosed in Unexamined Japanese Patent Publication No. 11-63021 is provided with a rotor that is rotatably supported by the end of the housing of the compressor. The rotor has an electromagnetic coil inside, and a driving belt is put round the outer periphery of the rotor with an engine pulley. Disposed coaxially with the rotor is an annular armature plate. The armature plate is contactable to and separatable from the end wall of the rotor and is also rotatable integrally with the main shaft of the compressor. More specifically, the armature plate is coupled to the main shaft through a coupling member and plate springs, and is elastically supported by the plate springs.

According to this electromagnetic clutch, when the electromagnetic coil is not excited, the armature plate is located at the OFF position that is away from the rotor due to the urging force of the plate springs. When the electromagnetic coil is excited, however, the armature plate is displaced from the OFF position to the ON position in which it is joined to the rotor. In other words, the armature plate is displaced toward the rotor, resisting the urging force of the plate springs due to the attraction of the electromagnetic coil, and is pressed against the rotor. At this point, the rotor is driven to rotate through the driving belt, so that the rotor brings the armature plate to rotate therewith through the use of a frictional force, to thereby rotate the main shaft of the compressor through the plate springs and the coupling portion.

The above-described electromagnetic clutch requires that the armature plate be disposed parallel to the rotor with high accuracy in order to achieve the secure couplement of the armature plate with the rotor. For this reason, both the coupling member and the plate springs supporting the armature plate require high accuracy not only in their shapes and dimensions but also in assembly.

In case that the supporting means of the armature plate is constructed with the coupling member and the plate springs, there occurs a problem that the number of components of the supporting means are increased, and that it is difficult to improve the accuracy in assembly.

SUMMARY OF THE INVENTION

An object of the present invention consists in providing an electromagnetic clutch in which it is possible to reduce the number of components by forming a coupling member and plate springs integrally and to dispose an armature plate parallel to a rotor securely and easily.

To accomplish the above object, the present invention provides an electromagnetic clutch for separably coupling a drive source and a rotary shaft. The electromagnetic clutch comprises: a rotor to be disposed in the outside of the rotary shaft concentrically therewith and rotated by the drive source; an electromagnetic coil accommodated in the rotor; an armature plate attracted toward the rotor by an electromagnetic force generated by the electromagnetic coil so as to adhere to the rotor; and a coupler for coupling the armature plate and the rotary shaft to each other, the coupler including a center part to be coupled to the rotary shaft and an elastically-deformable outer part for coupling the center part to the armature plate, the outer part being extended from the center part and elastically deformed when the armature plate is attracted to the rotor.

In concrete terms, the center part of the coupler includes a metal sleeve that is coupled to the rotary shaft, and the outer part is made of resin that is insert-molded with the sleeve.

With the aforementioned structure, the coupler is made as an one-piece member, and this heightens disposition accuracy of the armature plate in relation to the rotary shaft. Therefore, it is possible to arrange the armature plate parallel to the rotor without fail. Since the coupler is made up of one component, and the total number of all components is accordingly small, the assemble of the electromagnetic clutch is easy. Furthermore, the insert molding facilitates production of the coupler and achieves high accuracy in a shape and dimensions of the coupler. In addition, the production cost can be reduced.

The outer part is preferably made of heat-hardening resin. In this case, the coupler has an excellent heat resistance.

It is also preferable that the coupler further includes a boss part integrally formed with the outer part, the boss part being mounted on said sleeve. Since the boss part is thicker than the outer part, elastic deformation of the boss part is prevented. It is then possible to suppress a reduction in coupling strength between the outer part and the sleeve through the boss part.

Preferably, one of the sleeve and boss part has a groove and the other has a projection engaged with the groove. In this case, there generates no relative rotation between the outer part and the sleeve, so that a rotating force of the rotor can be reliably transmitted to the rotary shaft.

In a concrete embodiment, the outer part includes a plurality of straight elastic pieces. Each of the elastic pieces has a tip end fixed to an outer peripheral part of the armature plate. The elastic piece also has an axis intersecting a rotating direction of the armature plate at either an obtuse angle or an acute angle.

In another concrete embodiment, the outer part includes a plurality of straight elastic pieces. The tip end of each elastic piece is fixed to the outer peripheral part of the armature plate, and the elastic piece also has an axis intersecting the rotating direction of the armature plate at a right angle. The outer part further includes an elastic ring that couples the tip ends of the elastic pieces to one another.

In still another concrete embodiment, the coupler is further provided with a plurality of rivets for coupling the outer part to the armature plate. A part of each rivet is embedded in the outer part by insert molding.

It is preferable that the coupler further have a plurality of metal rings embedded in the outer part by insert molding, and a plurality of rivets passing through the corresponding metal ring to join the outer part and the armature plate to each other.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
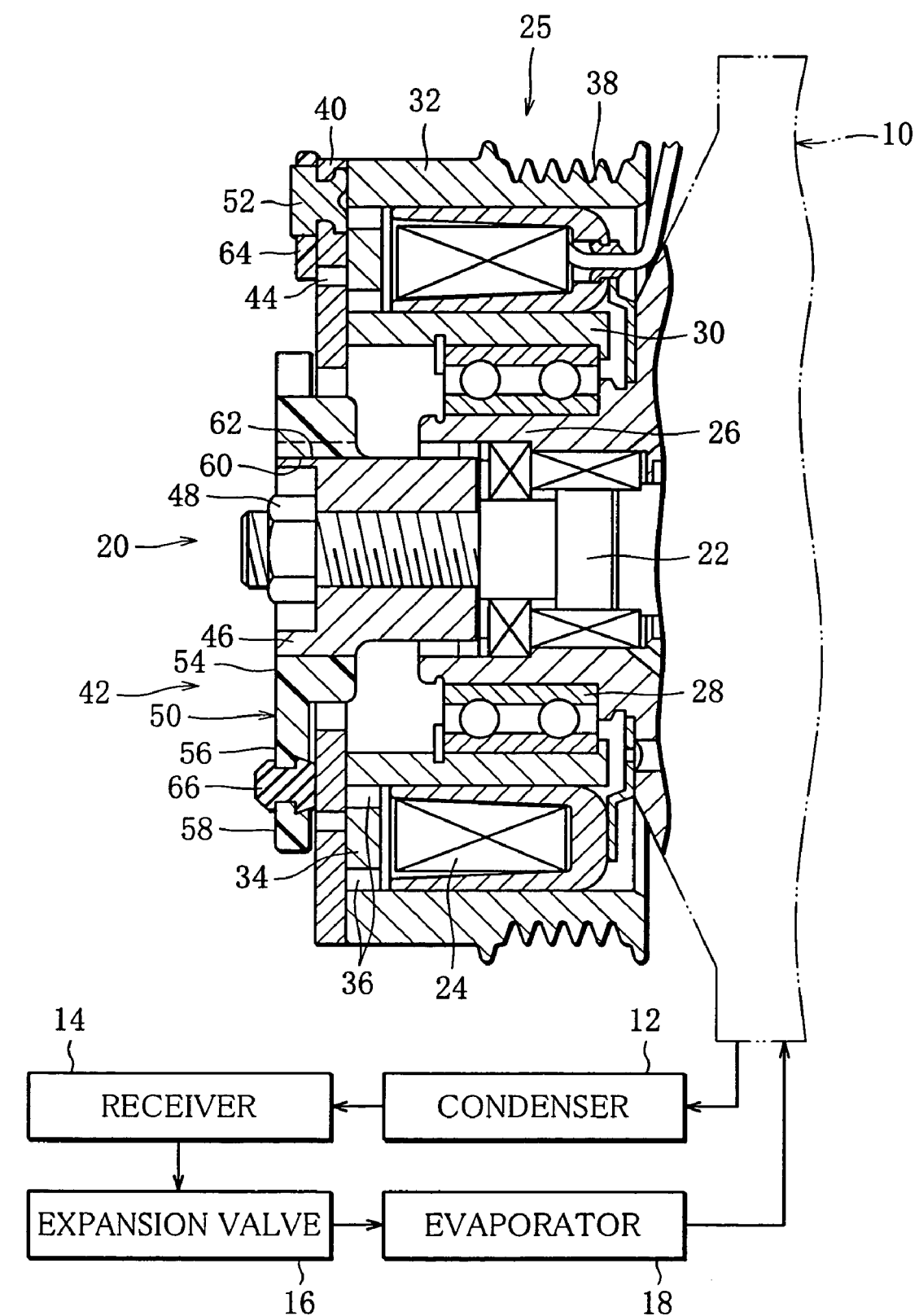
FIG. 1 is a vertical section of an electromagnetic clutch according to a first embodiment, which is mounted on a compressor.

FIG. 1 shows a refrigerating circuit of a vehicle air-conditioning system. In a circulation line of the refrigerating circuit, there are interposed a compressor 10, a condenser 12, a receiver 14, an expansion valve 16 and an evaporator 18 in the order named, with respect to a direction in that a refrigerant circulates. The compressor 10 is provided with an electromagnetic clutch 20 of a first embodiment, and a driving force from an engine, not shown, is intermittently transmitted through the electromagnetic clutch 20 to a main shaft of the compressor 10. A compression unit, not shown, of the compressor 10 is driven with rotation of the main shaft 22, to thereby circulate the refrigerant in the refrigerating circuit. The compressor 10 may be either of a scroll-type or of a swash plate-type.

The electromagnetic clutch 20 includes a rotor 25. The rotor 25 is rotatably supported by an end portion 26 of a housing of the compressor 10 through a ball bearing 28. Concretely, the rotor 25 has an inner peripheral wall 30 and an outer peripheral wall 32. The inner peripheral wall 30 integrally continues to the outer peripheral wall 32 with an annular end wall 34 therebetween. Formed in the end wall 34 are a plurality of slits 36. The slits 36 extend intermittently in a circumferential direction to regulate magnetic flux. There is formed a belt groove 38 in an outer peripheral surface of the outer peripheral wall 32. A driving belt, not shown, for transmitting the driving force from the engine is fit into the belt groove 38.

The rotor 25 accommodates an electromagnetic coil 24 between the inner peripheral wall 30 and the outer peripheral wall 32 with a stator 33 fitted thereto. The stator 33 is fixed to the housing of the compressor 10 through a bracket 35 and kept in slide contact with the inner peripheral wall 30 and the outer peripheral wall 32.

An annular armature plate 40 is coaxially arranged on the end wall 34 side of the rotor 25 and is made of a magnetic material, such as an iron-based material. The armature plate 40 is supported by the main shaft 22 of the compressor 10 through a coupler 42 so that the armature plate 40 is allowed to contact with and separate from the rotor 25 and integrally rotate with the main shaft 22. The armature plate 40 is also provided with a slit 44 extending intermittently in a circumferential direction.

The coupler 42 of the armature plate 40 includes a hard sleeve 46 made of metal. The sleeve 46 extends from the end portion 26 of the housing, passing through the armature plate 40, and an end portion of the main shaft 22 is screwed therein. The end portion of the main shaft 22 passes through the sleeve 46, and a nut 48 is fastened to a tip end of the main shaft 22 to prevent the sleeve 46 from coming off.

The coupler 42 includes a coupling member 50. The coupling member 50 is made of heat-hardening resin having elasticity. The sleeve 46 and a plurality of rivets 52 are integrally included in the coupling member 50 by insert molding. In concrete terms, the coupler 50 includes a boss 54, a flange 56 and a plurality of arms 58, which are integrally molded, the boss 54 being integrally mounted with an outer end portion of the sleeve 46 from the outside in a radial direction thereof. Provided in between the sleeve 46 and the boss 54 are an engaging projection 60 and an engaging groove 62 serving in combination as engaging means for inhibiting relative rotation. Concretely, in the coupler 42, the engaging projection 60 is integrally formed in the boss 54, and the engaging groove 62 in the sleeve 46.

Figure 2:
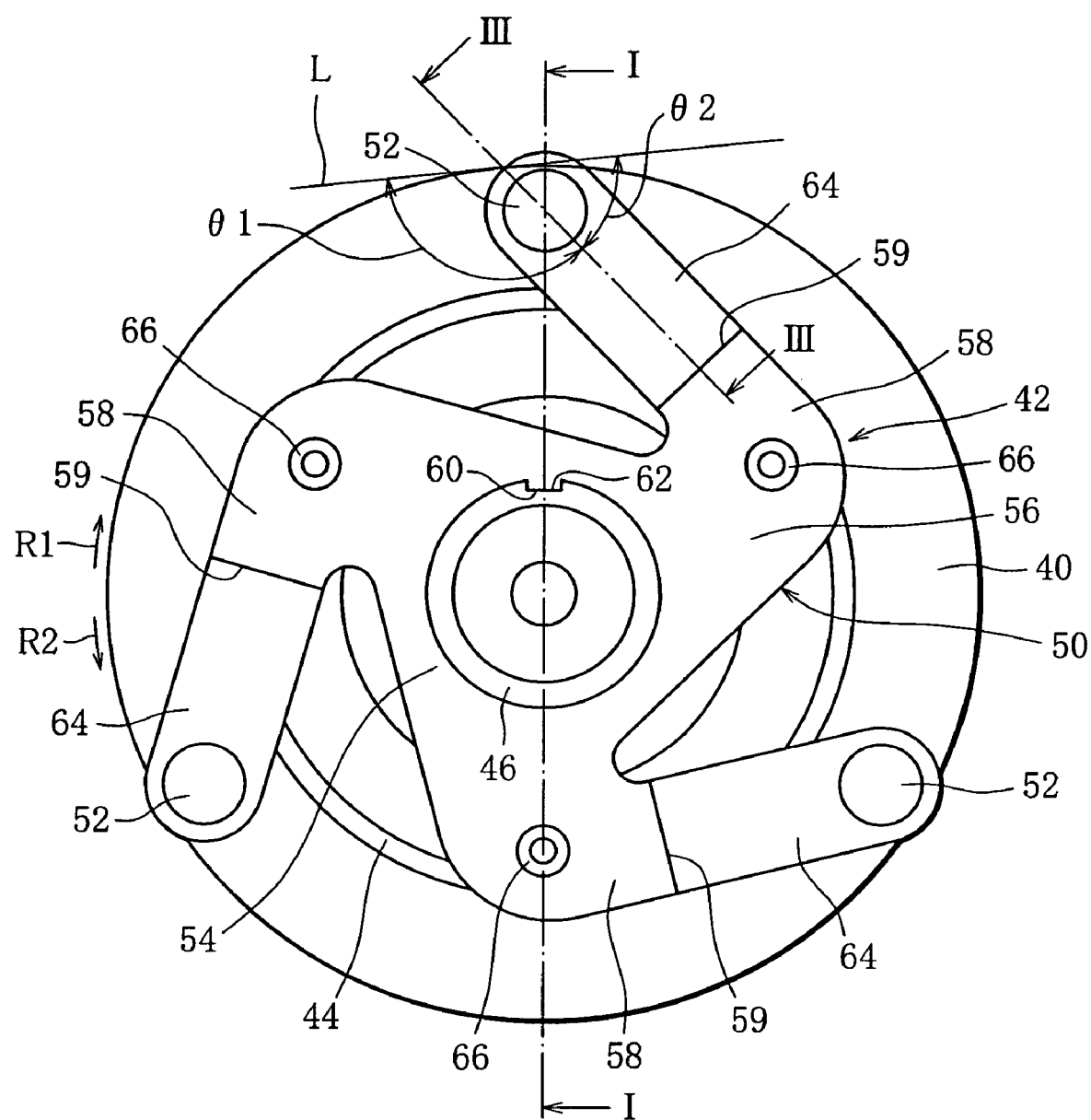
FIG. 2 is an elevation view of a coupler applied to the electromagnetic clutch of FIG. 1 with an armature plate fixed thereto.

The flange 56 is integrally formed in a portion of the boss 54, which protrudes from an outer surface of the armature plate 40. As illustrated in FIG. 2, the flange 56 is formed into a substantially triangular plate, and the boss 54 passes through the flange 56 at a substantial center thereof in a normal direction thereof.

Figure 3:
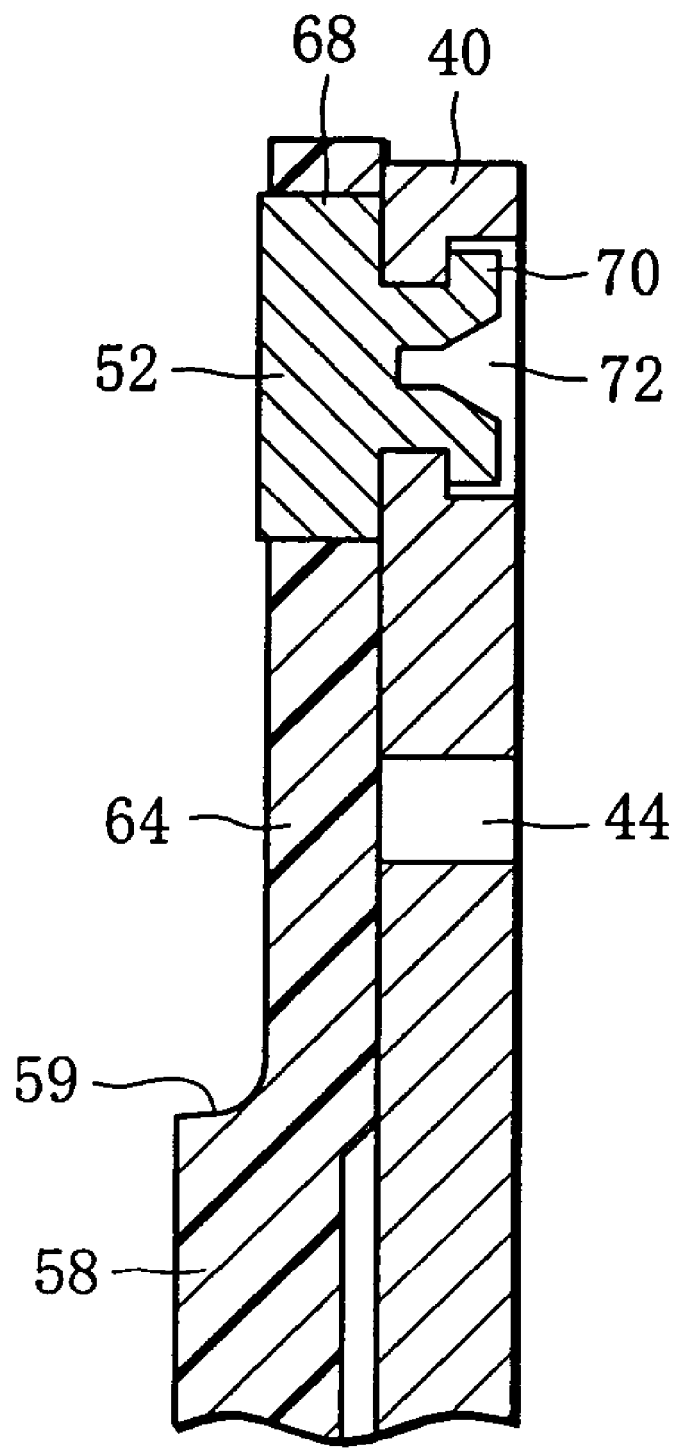
FIG. 3 is an enlarged partial section taken along line III-III of FIG. 2.

Each of the arms 58 extends from an apex area of the flange 56 outward, with respect to a radial direction of the boss 54. The arms 58 are arranged at regular intervals in a circumferential direction of the boss 54. A tip end of each arm 58 is positioned near an outer periphery of the outer surface of the armature plate 40. Herein, each arm 58 has a step 59 near a base end thereof and also includes a region that straightly expands from the step 59 to the tip end thereof with a fixed width. As illustrated in FIG. 3, although having a fixed thickness, the region is thinner than the base end of the arm 58 and functions as an elastic piece. Therefore, the region of the arm 58 is hereinafter referred to as a plate spring 64. In addition, the base end of the arm 58 has the same thickness as the flange 56.

Referring to FIG. 1, there is provided a through-hole in the base end of each arm 58, and a rubber cushion 66 is interfitted in the through-hole. Each rubber cushion 66 projects by a given length toward the armature plate 40, and a projecting end thereof is brought into contact with the armature plate 40. In other words, the rubber cushions 66 provide a fixed space between the base ends of the arms 58, namely the flange 56, and the armature plate 40. The plate spring 64, as shown in FIG. 3, continues to the base end of the arm 58 through the step 59 and contacts with the outer surface of the armature plate 40.

Integrally mounted on a tip end of the plate spring 64 is the corresponding rivet 52. The coupler 42 is joined to the armature plate 40 by the rivets 52. More specifically, each of the rivets 52 has an axial portion 68 embedded in the tip end of the plate spring 64 by insert molding. The rivet 52 has legs 70 protruding from the plate spring 64 and engaged with an engaging aperture 72 of the armature plate 40. The legs 70 of the rivet 52 are bent in the engaging aperture 72 of the armature plate 40, thereby preventing disengagement of the legs 70.

Herein, the plate spring 64 has an axis that obliquely intersects rotating directions R1 and R2 of the armature plate 40. Concretely, as illustrated in FIG. 2, when the coupler 42 rotates in the rotating direction R1, θ1 is an obtuse angle, where L is a tangent with respect to the armature plate 40 at an intersection between the axis of the plate spring 64 and an outer peripheral edge of the armature plate 40, and where θ1 is an angle between the axis of the plate spring 64 and the tangent L. In case that the coupler 42 rotates in the rotating direction R2, θ2 is an acute angle, where θ2 is an angle between the axis of the plate spring 64 and the tangent L.

According to the electromagnetic clutch 20, when the electromagnetic coil 24 is not applied with current, the armature plate 40 is located at an OFF position that is away from the rotor 25 due to an urging force of the plate springs 64, so that a rotating force of the rotor 25 is not transmitted to the armature plate 40.

On the contrary, when the electromagnetic coil 24 is applied with current, the armature plate 40 is located at an ON position that is in contact with the rotor 25 due to a magnetic field generated by the electromagnetic coil 24. More specifically, while the current is applied to the electromagnetic coil 24, the magnetic field of the electromagnetic coil 24 makes the rotor 25 an electromagnet. Thus, the armature plate 40 magnetically adheres to the end wall 34 of the rotor 25, resisting the urging force of the plate springs 64, thereby joining the rotor 25 and the armature plate 40 to each other. As a result, the rotating force of the rotor 25 is transmitted to the armature plate 40 due to friction. The rotating force is then transmitted sequentially to the plate springs 64 (arms 58), the flange. 56, the sleeve 46 and the main shaft 22. Consequently, by using the rotating force transmitted to the main shaft 22 as a driving force, the compression unit of the compressor 10 performs intake and compression of the refrigerant. Therefore, the refrigerant is circulated in the refrigerating circuit.

According to the electromagnetic clutch 20, the coupler 42 is made as an one-piece member, which heightens deposition accuracy of the armature plate 40 in relation to the main shaft 22. It is then possible to dispose the armature plate 40 precisely parallel to the rotor 25. When the armature plate 40 is at the OFF position, an appropriate gap is secured between the armature plate 40 and the rotor 25. Furthermore, since the coupler 42 is made up of one component, and the total number of all components is accordingly small, assemble of the electromagnetic clutch 20 is easy. Additionally, the insert molding facilitates production of the coupler and heightens accuracy in a shape and dimensions thereof.

The electromagnetic clutch 20 is light in weight because of the coupling member 50 made of resin, and also has excellent heat resistance due to a heat-hardening characteristic of the resin.

According to the electromagnetic clutch 20, since the thickness of the plate spring 64 is smaller than that of the flange 56, elastic deformation takes place only in the plate spring 64 when the armature plate 40 is displaced from the OFF position to the ON position. Thus, elastic deformation of the flange 56 and the boss 54 is suppressed, thereby preventing a reduction in coupling strength between the boss 54 and the sleeve 46.

According to the electromagnetic clutch 20, the sleeve 46 is made of a hard material, such as metal, which prevent a reduction in coupling strength between the main shaft 22 and the sleeve 46 and furthermore improves abrasion-resistance of the sleeve 46 to the main shaft 22.

According to the electromagnetic clutch 20, the boss 54 and the sleeve 46 are engaged with each other by way of the engaging groove 62 and the engaging projection 60. Thus, there generates no relative rotation between the boss 54 and the sleeve 46, so that it is possible to reliably transmit the rotating force of the rotor 25 to the main shaft 22.

Figure 4:
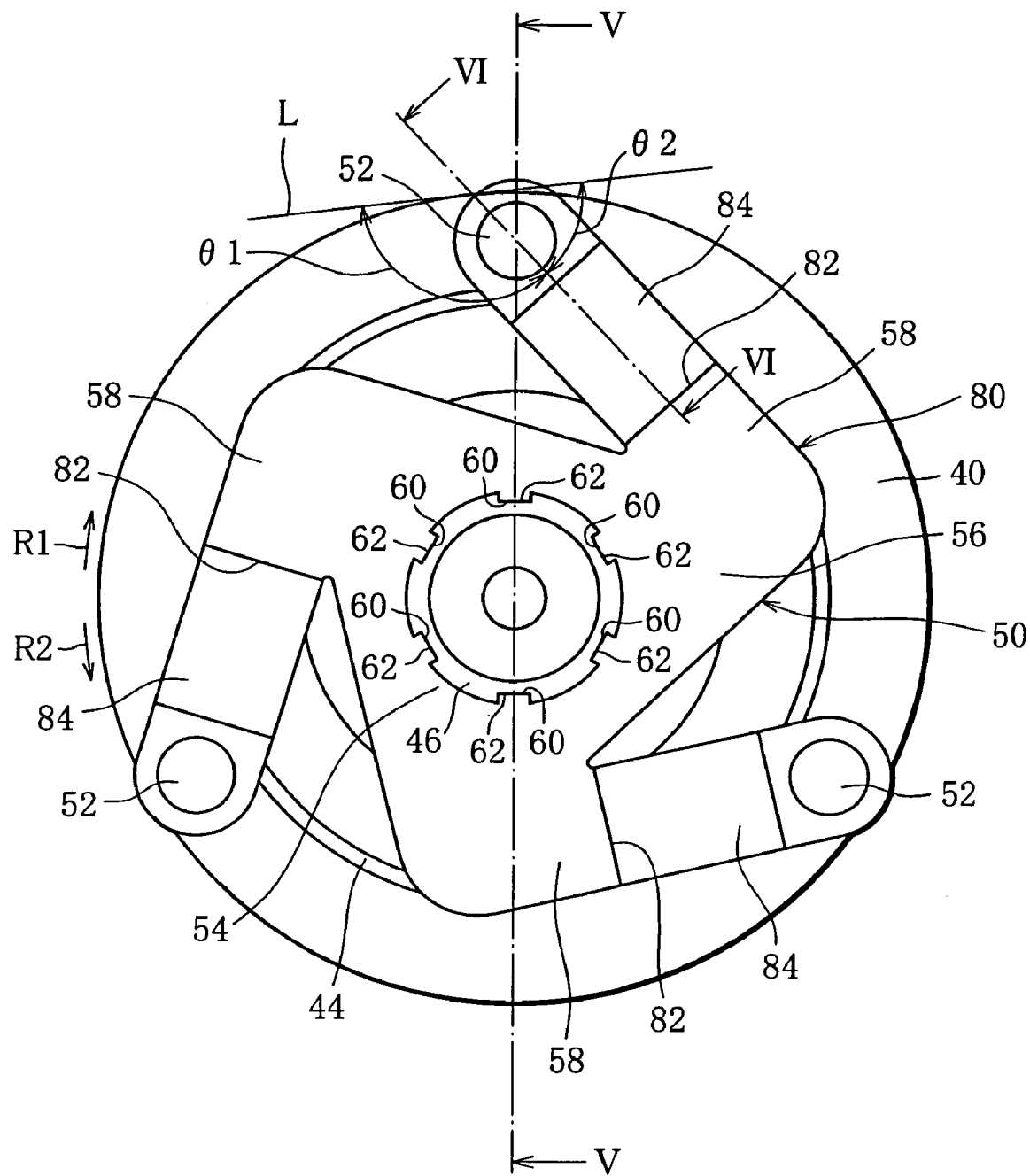
FIG. 4 is an elevation view of a coupler according to a second embodiment with the armature plate fixed thereto.
Figure 5:
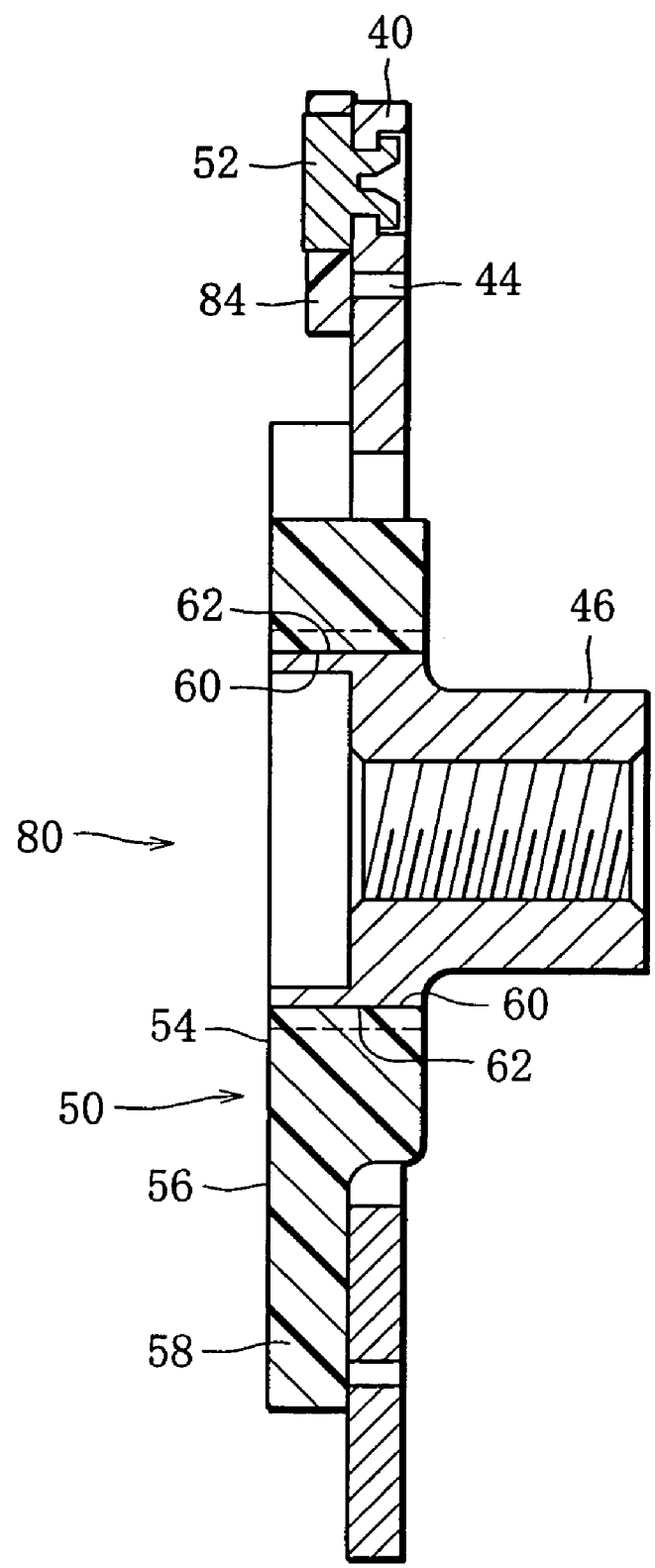
FIG. 5 is a section taken along line V-V of FIG. 4.

The present invention is not limited to the aforementioned embodiment and may be modified in various ways. For instance, FIGS. 4, 5 and 6 each show a coupler 80 of a second embodiment with the armature plate 40. Identical components to those in the first embodiment are denoted by the same reference numerals, and a redundant explanation thereof will be omitted.

In the coupler 80, there are formed six engaging projections 60 and respective engaging grooves 62 in between the sleeve 46 and the boss 54. The engaging projections 60 and the corresponding engaging grooves 62 are arranged at regular intervals in the circumferential direction of the boss 54. In this case, the engaging projections 60 and the engaging grooves 62 further improve the coupling strength between the sleeve 46 and the main shaft 22. This makes it possible to entirely prevent the relative rotation between the boss 54 and the sleeve 46.

Figure 6:
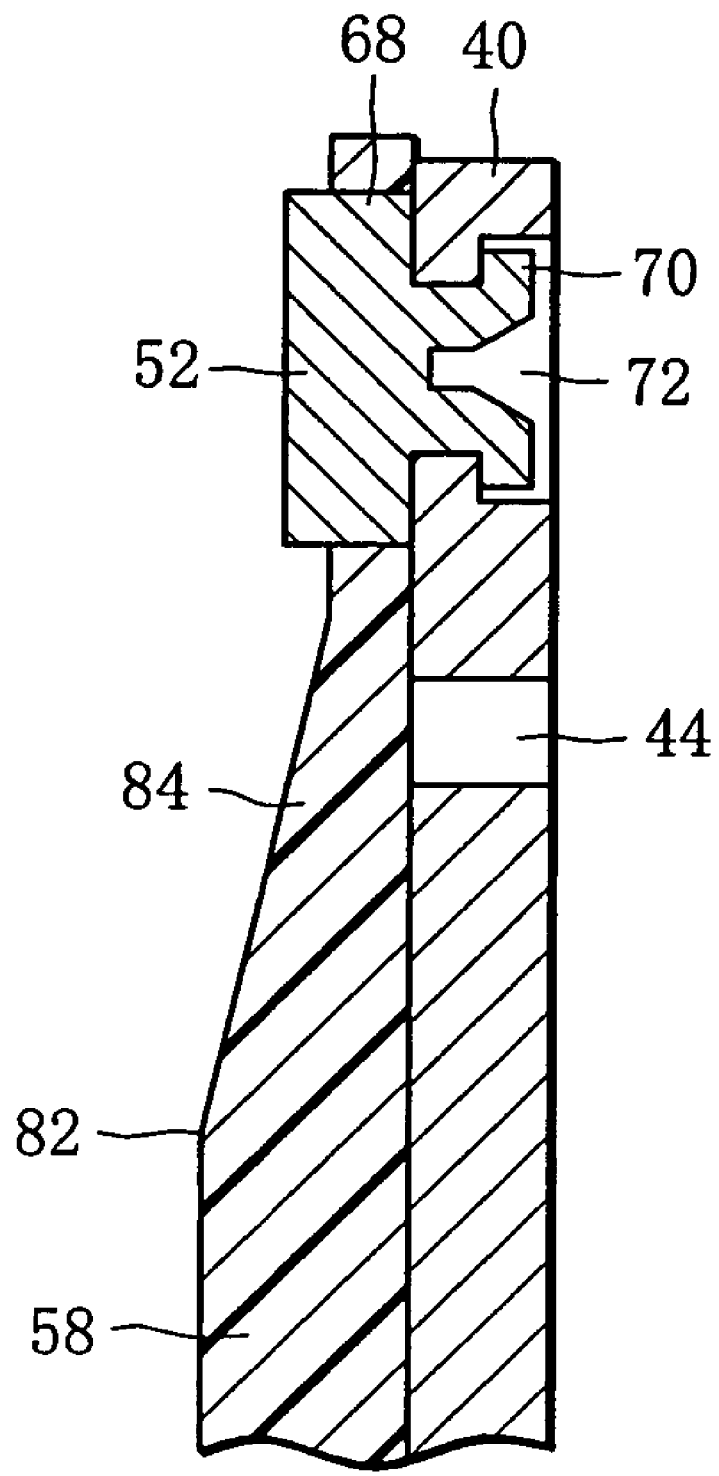
FIG. 6 is an enlarged partial section taken along line VI-VI of FIG. 4.

There is no rubber cushion attached to the base end of the arm 58, and the coupling member 50 is in tight contact to an opposite outer portion of the armature plate 40. The arm 58, as illustrated in FIG. 6, has a ridgeline 82 orthogonal to an axis thereof near the base end. A region expanding from the ridgeline 82 to the tip end is formed as a plate spring 84. The plate spring 84 gets thinner in thickness from the ridgeline 82 toward the tip end thereof. When the plate springs 84 are bent, stress is applied mainly to the flange 56 having great thickness. This elongates the life of the plate springs 84.

Figure 7:
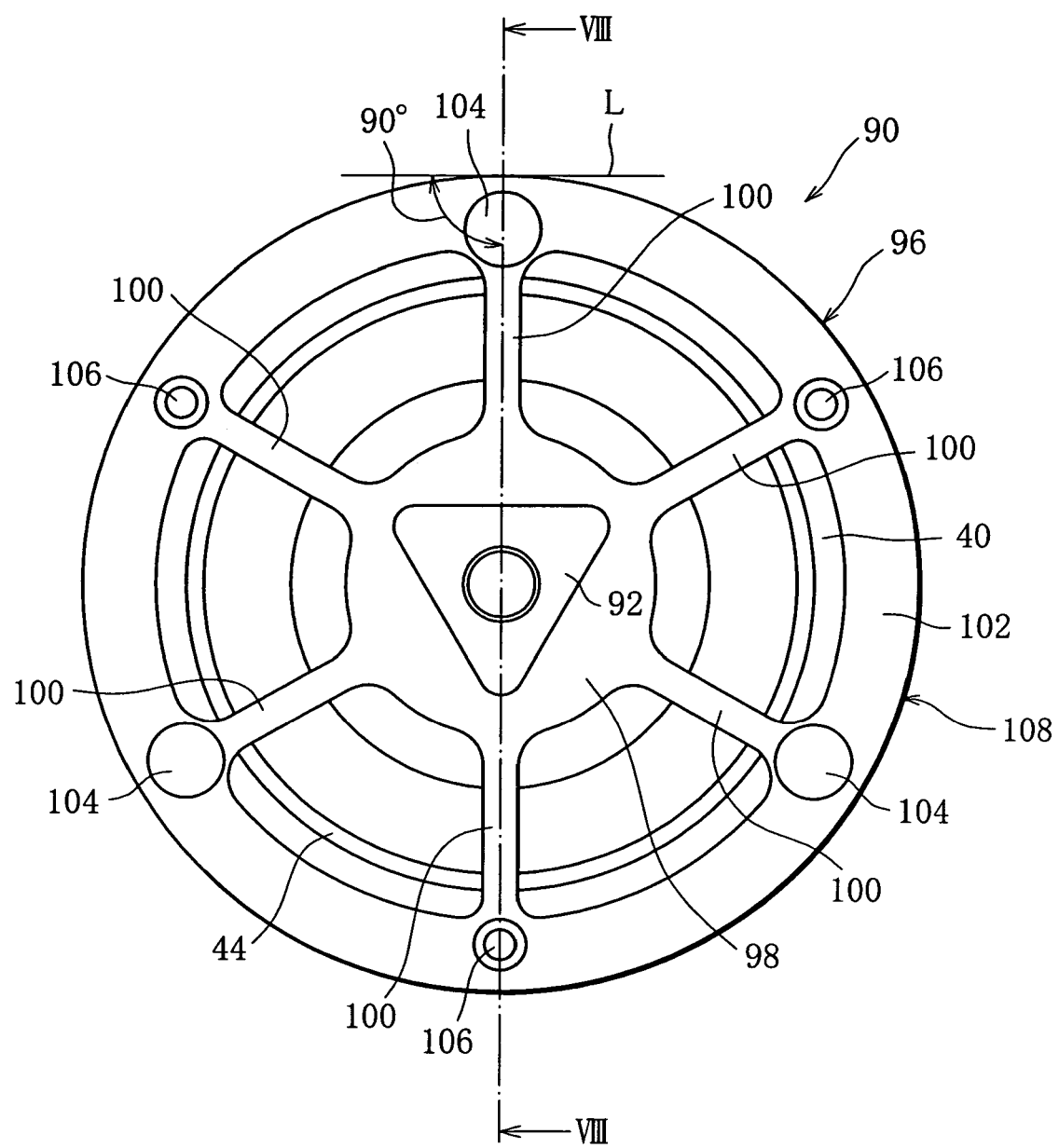
FIG. 7 is an elevation view of a coupler according to a third embodiment with the armature plate fixed thereto.
Figure 8:
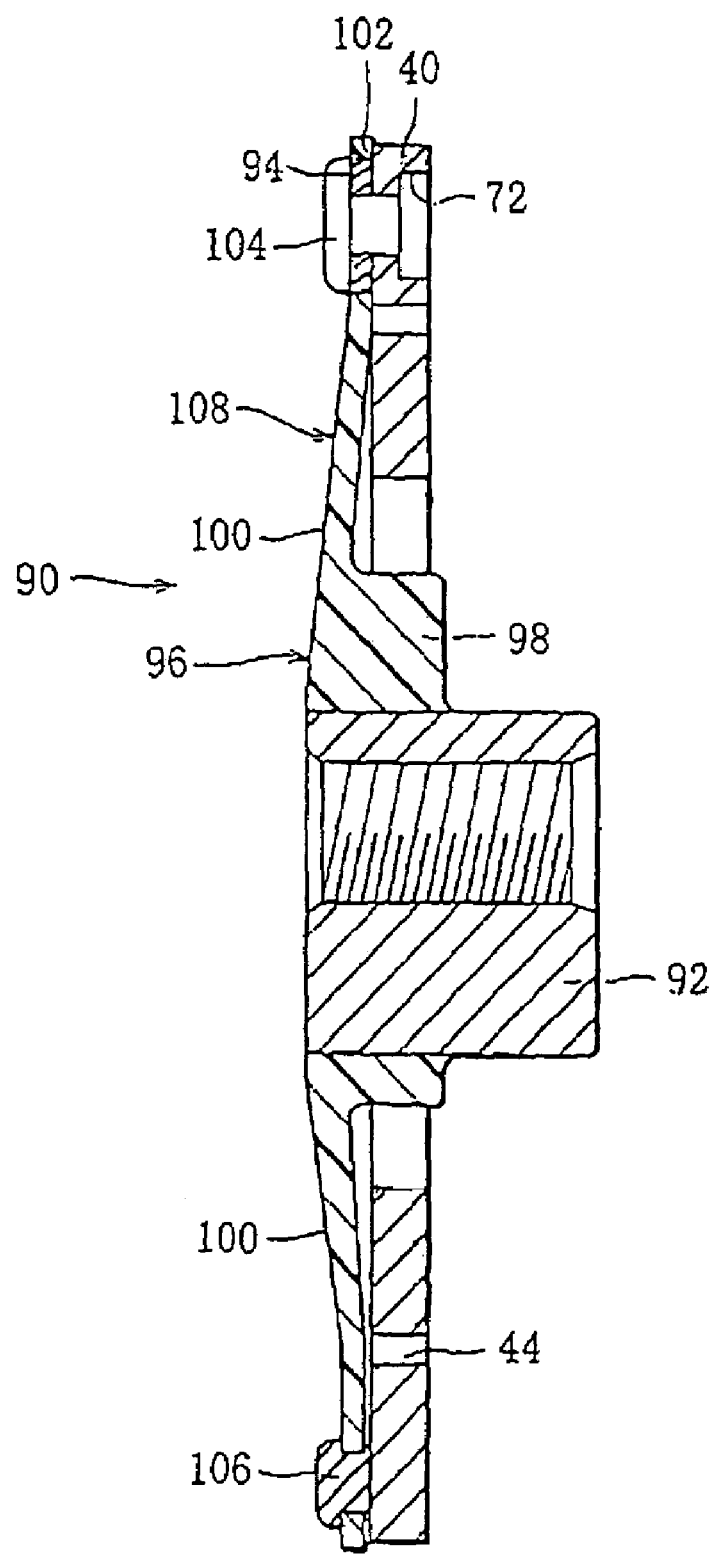
FIG. 8 is a section taken along line VIII-VIII of FIG. 7.

FIGS. 7 and 8 show a coupler 90 of a third embodiment with the armature plate 40.

The coupler 90 includes a block 92 serving as a sleeve, which is formed in the shape of a triangle pole. The block 92 has a screw hole, and screwed in the screw hole is an end portion of the main shaft 22. The block 92 is integrally included in a coupling member 96 by insert molding together with a plurality of hard metal rings 94.

The coupling member 96 is made of heat-hardening resin having elasticity and has a shape similar to a steering wheel. In other words, the coupling member 96 includes a boss 98, six arms 100 and a rim 102, which are molded integrally. The boss 98 is formed into a substantially orthohexagonal pole that is rounded, and is integrally mounted on an outer end portion of the block 92 from the outside in a radial direction thereof.

The arms 100 radially extend from the respective apexes of the boss 98 up to a rim 102. Accordingly, each arm 100 has an axis orthogonal to the tangent L at the intersection between the axis and the outer peripheral edge of the armature plate 40. As illustrated in FIG. 8, the arm 100 is smaller in thickness than the boss 98 and gets thinner by degrees from the boss 98 toward the tip end thereof.

The rim 102 is supported by the boss 98 through the arms 100 and disposed concentrically with the boss 98. The rim 102 is formed in an annular shape to be substantially level with the outer surface of the armature plate 40, and has the same thickness as the tip ends of the arms 100. The rim 102 also has an external diameter that is substantially equal to an external diameter of the armature plate 40 and expands along the outer peripheral edge of the armature plate 40. The rim 102 is provided with the rings 94 and through-holes alternating at positions located in a circumferential direction in which the arms 100 are joined to one another. Fixed to the rings 94 are rivets 104, and each rivet has a head that is crushed in the engaging aperture 72 of the armature plate 40. Therefore, the armature plate 40 and the coupler 90 are fixed to each other by the rivets 104. Moreover, rubber cushions 106 are interfitted in the respective through-holes.

In the coupler 90, each arm 100 functions as a straight elastic piece, and the rim 102 as an annular elastic piece. Since the tip ends of the arms 100 are coupled to the rim 102, the arms 100 and the rim 102 act in consort as one elastic body 108. Thus, if there is a minor difference in elastic force between the arms 100 due to variation of shapes and sizes of the arms 100, an urging force is uniformized in the entire elastic body 108. This makes it possible to evenly urge the entire armature plate 40.

Furthermore, mounting portions for the rivets 104, located in the rim 102, are reinforced by the rings 94, so that stress is not focused on the rim 102, to thereby prevent damage to the rim 102.

Figure 9:
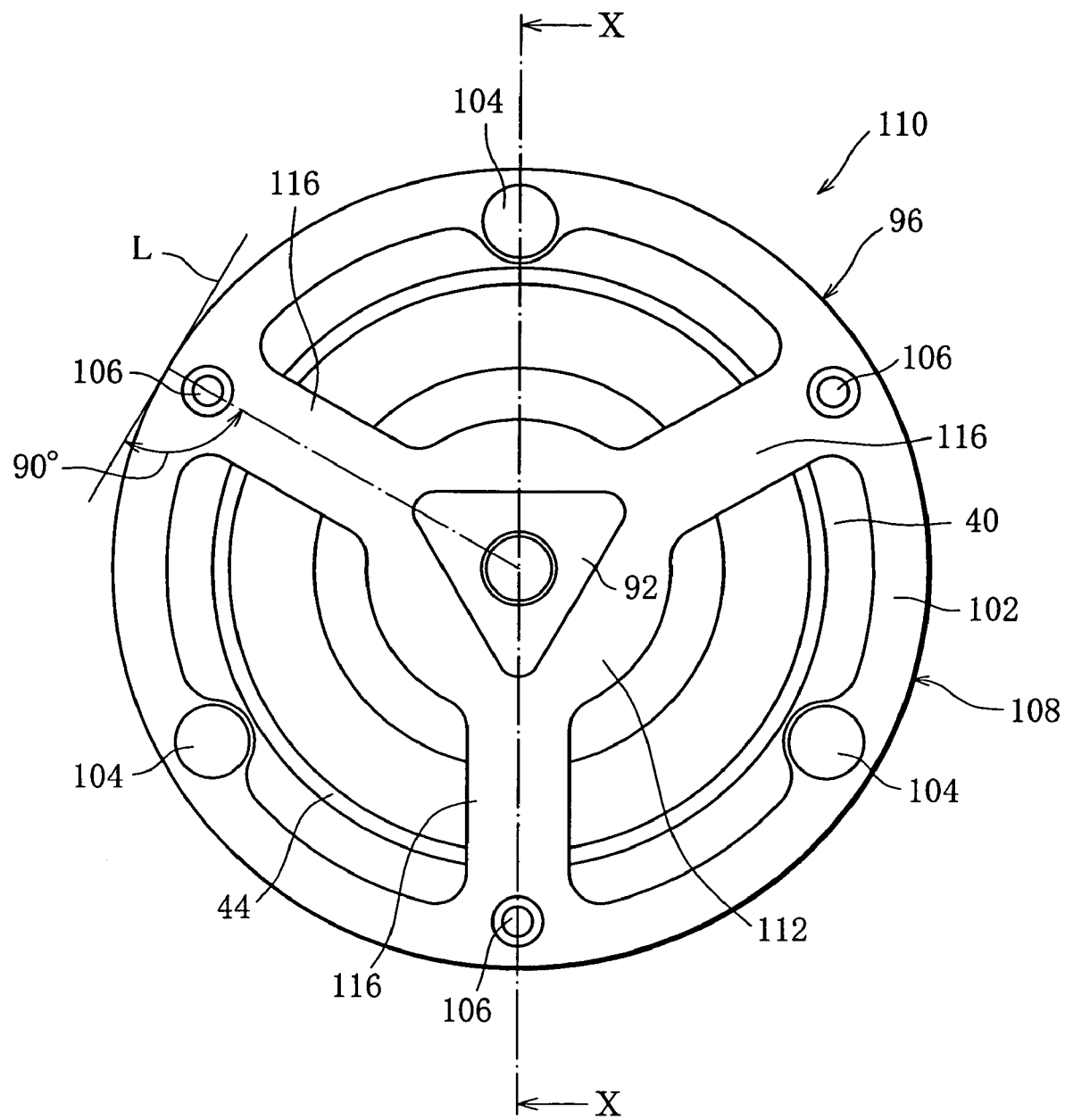
FIG. 9 is an elevation view of a coupler according to a fourth embodiment with the armature plate fixed thereto.
Figure 10:
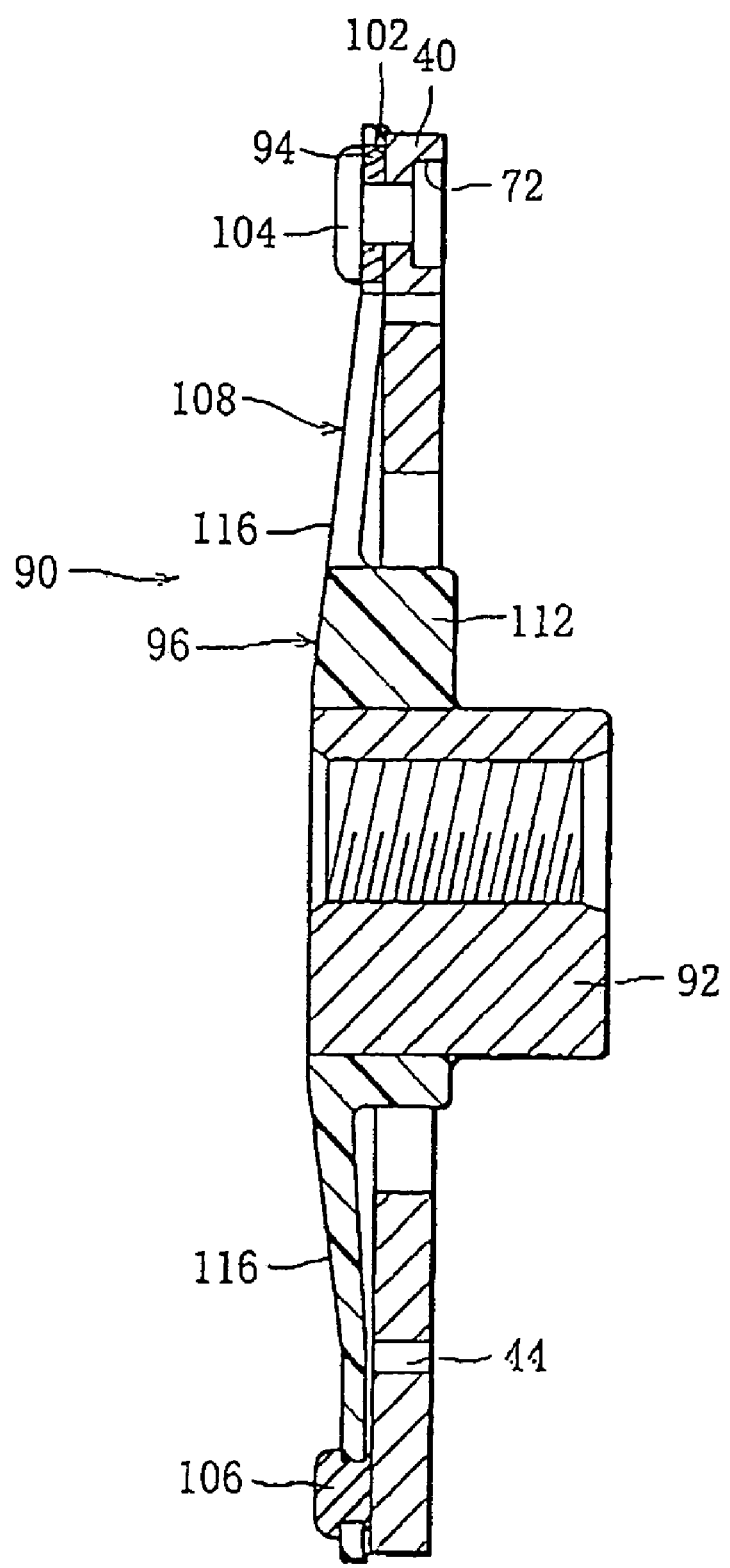
FIG. 10 is a section taken along line X-X of FIG. 9.

FIGS. 9 and 10 show a coupler 110 of a fourth embodiment with the armature plate 40.

In the coupler 110, a boss 112 is formed into a cylinder and has no arm extending from the boss 112 toward the rivets 104. The coupler 110 is different from the coupler 90 in the respect that each arm 116 is broad.

According to the coupler 110, there is a long distance between the boss 112 and the rivet 104 through the arm 116 and the rim 102, or between the boss 112 and a coupling portion that is coupled to the armature plate 40. This means that the urging force of the entire elastic body 108 is increased. Therefore, if the coupler 110 is applied to the electromagnetic clutch 20, it is possible to securely carry out the contact and separation of the armature plate 40 with respect to the rotor 25.

What is claimed is:

1. An electromagnetic clutch for separably coupling a drive source and a rotary shaft to each other, comprising:
    a rotor to be disposed in the outside of said rotary shaft concentrically therewith, said rotor being rotated by said drive source; an electromagnetic coil accommodated in said rotor;
    an armature plate allowed to be attracted toward said rotor by an electromagnetic force generated by said electromagnetic coil so as to adhere to said rotor; and
    a coupler for coupling said armature plate and said rotary shaft to each other, said coupler including
        a center part to be coupled to said rotary shaft, including a metal sleeve to be coupled to said rotary shaft,
        an elastically-deformable outer part comprising heat-hardening resin for coupling the center part to said armature plate, the outer part being made of resin that is insert-molded with said sleeve and being extended from the center part and elastically deformed when said armature plate is attracted to said rotor, wherein said coupler is joined to said armature plate at the deformable outer part,
        a plurality of metal rings embedded in said outer part by insert molding, and
        a plurality of rivets, each of which passes through a corresponding one of said metal rings to join said outer part and said armature plate to each other.

2. The electromagnetic clutch according to claim 1, wherein said coupler further includes a boss part integrally formed with the outer part, the boss part being mounted on said sleeve.

3. The electromagnetic clutch according to claim 2, wherein one of said sleeve and boss part has a groove and the other has a projection engaged with the groove.

4. The electromagnetic clutch according to claim 1, wherein said outer part includes a plurality of straight elastic pieces, each of said elastic pieces having a tip end fixed to an outer peripheral part of said armature plate and an axis intersecting a rotating direction of said armature plate at one of an obtuse angle and an acute angle.

5. The electromagnetic clutch according to claim 1, wherein said outer part includes a plurality of straight elastic pieces, each of said elastic pieces having a tip end fixed to an outer peripheral part of said armature and an axis intersecting a rotating direction of said armature plate at a right angle.

6. The electromagnetic clutch according to claim 5, wherein said outer part further includes an elastic annular rim that couples the tip ends of said elastic pieces to one another.

7. The electromagnetic clutch according to claim 1, wherein said coupler further includes a plurality of rivets for coupling said outer part to said armature plate, a part of each of said rivets being embedded in said outer part by insert molding.

* * * * *